United States Patent Office 3,133,076
Patented May 12, 1964

3,133,076
PHENYL-IMIDAZO(1,2-a)PYRIDINE-6-CAR-
BOXYLIC ACIDS AND THEIR ESTERS
Giorgio Ferrari, Milan, Italy, assignor to Simes S.p.A.,
Milan, Italy, a corporation of Italy
No Drawing. Filed June 15, 1961, Ser. No. 117,273
Claims priority, application Italy Apr. 6, 1961
7 Claims. (Cl. 260—295)

The present invention refers to new heterocyclic nitrogen compounds with one carboxylic function, and to their preparation intermediates. The new compounds belong to the imidazo(1,2-a)pyridine group, of which they constitute a new class inasmuch as, containing in the pyridine part of the nucleus a carboxylic radical of this series not known until now.

The structural formula of the new compounds is illustrated below:

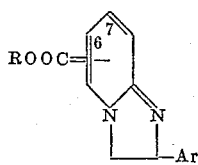
(I)

where R may be an hydrogen atom or a lower alkyl radical such as methyl, propyl, ethyl etc. while Ar is an aryl residue, preferably phenyl, eventually substituted with halogen atoms or alkyl or lower alkoxy groups. The new compounds of the invention find particular use as intermediates for pharmaceutical products or, as such, in the quality of sensitizer for photographic films. They are also useful as diuretics. The aryl-imidazopyridine-carboxylic acids mentioned above are obtained by a general method reacting the alkyl ester of an α-aminopyridine carboxylic acid with an ω-halogen-methylarylketone according to the reaction:

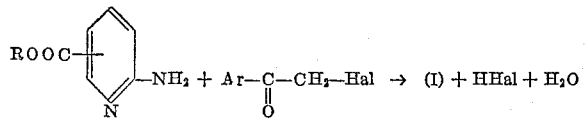

In this equation R and Ar have the same significance as indicated above while Hal represents a halogen atom such as chlorine, bromine, fluorine or iodine.

The reaction just described may be carried out in different ways. It has been shown to be particularly suitable to conduct the reaction in the presence of a hydrogen-halide acid neutralizer, which may be an alkaline or alkaline-earth bicarbonate or carbonate, for example, sodium, potassium or lithium bicarbonate or the corresponding carbonates, or calcium or barium carbonate.

The reaction under discussion may be run particularly easily at temperatures above room temperature and may be carried out in aqueous or anhydrous solvents such as alcohols, acetone, dioxane, diethyleneglycol-dimethyl-ether, as will be more amply described in the examples. The reaction temperatures are favorably included between room temperature and circa 120° C., most preferably (as mentioned above) between 50 and 100° C.

The resultant product is the phenyl-imidazo-pyridine-carboxylic ester corresponding to the α-aminopyridine-carboxylic ester which entered the reaction. This product is isolated from the reaction mixture by methods specified in the examples, and may be used as is for the practical applications referred to initially or else may be transformed into the corresponding acid by hydrolysis with mineral acids or strong bases according to known methods. Most convenient for the purpose is alkaline saponification, which may be conducted in the cold or hot by using hydrates of alkaline metals such as sodium or potassium hydrates in water or in alcohols such as ethanol or methanol.

The preparation of the compounds which are the subject of the present invention is illustrated with greater particularity in the examples which follow; examples which have, however, only a simple demonstrative scope and which in no way should be intended as limits to the invention.

EXAMPLE 1

*Methyl Ester of 2-Phenyl-Imidazo(1,2-a) Pyridine-6-Carboxylic Acid*

126 g. of methyl ester of 6-aminonicotinic acid, 165.5 g. ω,ω-dibromoacetophenone and 77 g. of sodium bicarbonate in 1500 ml. of methanol are heated under stirring and refluxed for 5 hrs. Thereafter the product is cooled and the precipitate is filtered and washed with water, alcohol and ether successively. Yield 160 g., M.P. 176–178° C.; after recrystallization from methanol, M.P. 180–181° C.

EXAMPLE 2

By using in Example 1 the ethyl ester of 6-aminonicotinic acid in place of the methyl ester of 6-aminonicotinic acid, the corresponding ethyl ester of 2-phenylimidazo (1,2-a)pyridine-6-carboxylic acid is prepared. M.P. 141–142° C.

EXAMPLE 3

*2-Phenylimidazo(1,2-a)Pyridine-6-Carboxylic Acid*

110 g. of the methyl ester of 2-phenylimidazo(1,2-a) pyridine-6-carboxylic acid are suspended in 3300 ml. of 10% NaOH and boiled for 15 minutes. The solution dissolves, it is cooled and brought to pH 5 by addition of acetic acid. Thereafter it is cooled, the precipitate is filtered and washed with water. Yield 105 g., M.P. 296–6° C. (dec.); M.P. 302–3° C. (dec.) after recrystallization from alcohol.

EXAMPLE 4

*Methyl Ester of 2-Phenylimidazo(1,2-a)Pyridine-7-Carboxylic Acid*

126 g. of the methyl ester of 2-amino-isonicotinic acid, 165.5 g. di-ω-bromoacetophenone, 77 g. of sodium bicarbonate in 1300 cc. of methanol are heated under stirring and refluxed for 5 hours. It is cooled, the precipitate is filtered and washed with water, methanol and ether.

Yield 165 g.; M.P. 188–189° C.; after recrystallization from methanol M.P. 190–1° C.

EXAMPLE 5

*2-Phenylimidazo(1,2-a)Pyridine-7-Carboxylic Acid*

To a solution of 57.5 g. of NaOH in 1150 ml. alcohol 115 g. of the methyl ester of 2-phenylimidazo(1,2-a)pyridine-7-carboxylic acid are added. The solution is refluxed for 2½ hours, cooled, the insoluble sodium salt is filtered off, washed with alcohol and dissolved in 2,500 ml. of water. The solution is brought to pH 5 by addition of acetic acid, the precipitate is filtered, washed with water and dried.

Yield 103 g., M.P. 195–6° C. (dec.); after recrystallization from alcohol, M.P. 302–4° C. (dec.).

I claim:

1. Aryl-imidazo-pyridinecarboxylic acids of formula:

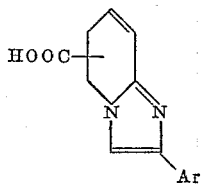

where Ar represents a radical taken from the class consisting of phenyl and phenyl substituted by a radical taken from the class consisting of halogen, lower alkyl and lower alkoxy.

2. Esters of aryl-imidazo-pyridinecarboxylic acids of formula:

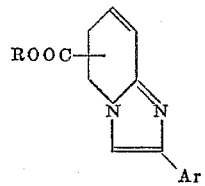

where R represents lower alkyl, while Ar represents a radical taken from the class consisting of phenyl and phenyl substituted by a radical taken from the class consisting of lower alkyl and lower alkoxy.

3. 2-phenyl-imidazo(1,2-a)pyridine-6-carboxylic acid.
4. 2-phenyl-imidazo(1,2-a)pyridine-7-carboxylic acid.
5. The methyl ester of 2-phenyl-imidazo(1,2-a)pyridine-6-carboxylic acid.
6. The ethyl ester of 2-phenyl-imidazo(1,2-a)pyridine-6-carboxylic acid.
7. The methyl ester of 2-phenyl-imidazo(1,2-a)pyridine-7-carboxylic acid.

References Cited in the file of this patent

UNITED STATES PATENTS 2,785,133    Craig _____ Mar. 12, 1957